(12) United States Patent
Wei et al.

(10) Patent No.: US 10,694,421 B2
(45) Date of Patent: Jun. 23, 2020

(54) METHODS AND DEVICES FOR PACKET DATA CONVERGENCE PROTOCOL (PDCP) DATA TRANSMISSION IN WIRELESS COMMUNICATION SYSTEMS

(71) Applicant: FG Innovation Company Limited, Tuen Mun (CN)

(72) Inventors: Chia-Hung Wei, Hsinchu (TW); Chie-Ming Chou, Hsinchu (TW); Hung-Chen Chen, Hsinchu (TW)

(73) Assignee: FG Innovation Company Limited, Tuen Mun (HK)

( * ) Notice: Subject to any disclaimer, the term of this patent is extended or adjusted under 35 U.S.C. 154(b) by 0 days.

(21) Appl. No.: 16/244,132

(22) Filed: Jan. 10, 2019

(65) Prior Publication Data
US 2019/0215719 A1    Jul. 11, 2019

Related U.S. Application Data

(60) Provisional application No. 62/615,497, filed on Jan. 10, 2018.

(51) Int. Cl.
*H04W 4/00*      (2018.01)
*H04W 28/06*     (2009.01)
*H04L 1/00*      (2006.01)
*H04W 80/02*     (2009.01)
*H04W 84/04*     (2009.01)

(52) U.S. Cl.
CPC .............. *H04W 28/06* (2013.01); *H04L 1/00* (2013.01); *H04W 80/02* (2013.01); *H04W 84/042* (2013.01)

(58) Field of Classification Search
CPC ... H04W 28/06; H04W 80/02; H04W 84/042; H04L 1/00
USPC ......................................... 370/328, 329, 330
See application file for complete search history.

(56) References Cited

U.S. PATENT DOCUMENTS

2018/0309660 A1* 10/2018 Loehr ............... H04W 36/0066
2019/0037433 A1*  1/2019 Nagasaka ......... H04W 28/0252
2019/0124677 A1*  4/2019 Kim .................. H04W 28/0278
2019/0132771 A1*  5/2019 Jheng .................. H04W 28/085
2019/0357129 A1* 11/2019 Park ...................... H04W 88/14
(Continued)

FOREIGN PATENT DOCUMENTS

| CN | 107342851 A | 11/2017 |
|---|---|---|
| WO | 2017/023438 A1 | 2/2017 |
| WO | 2017023438 A | 2/2017 |

OTHER PUBLICATIONS

U.S. Appl. No. 62/489,332, filed Apr. 24, 2017 (Year: 2017).*
(Continued)

*Primary Examiner* — Chuong T Ho
(74) *Attorney, Agent, or Firm* — ScienBiziP, P.C.

(57) ABSTRACT

A method, performed by a User Equipment (UE) including a Packet Data Convergence Protocol (PDCP) entity associated with two Radio Link Control (RLC) entities and configured with a duplication function that is not activated, includes: determining, by the PDCP entity, whether the two RLC entities belong to a same cell group, and submitting, by the PDCP entity, a PDCP Data Protocol Data Unit (PDU) to a primary RLC entity of the two RLC entities when the two RLC entities belong to the same cell group.

16 Claims, 11 Drawing Sheets

(56) References Cited

U.S. PATENT DOCUMENTS

2019/0373441 A1* 12/2019 Ryu ................... H04W 68/005
2020/0068437 A1* 2/2020 Lohr ................... H04W 76/19

OTHER PUBLICATIONS

3GPP 3rd Generation Partnership Project; Technical Specification Group Radio Access Network; NR; Packet Data Convergence Protocol (PDCP) specification (Release 15) 3GPP TS 38.323 V1.1.0 Nov. 30, 2017(Nov. 30, 2017) Section 5.

3rd Generation Partnership Project; Technical Specification Group Radio Access Network; NR; Packet Data Convergence Protocol (PDCP) specification (Release 15), 3GPP TS 38.323 V1.1.0, Nov. 30, 2017. p. 12, 15, 30.

\* cited by examiner

METHODS AND DEVICES FOR PACKET DATA CONVERGENCE PROTOCOL (PDCP) DATA TRANSMISSION IN WIRELESS COMMUNICATION SYSTEMS

CROSS-REFERENCE TO RELATED APPLICATION(S)

The present application claims the benefit of and priority to a provisional U.S. Patent Application Ser. No. 62/615,497 filed on Jan. 10, 2018, entitled "Data Value and Logical Channel Prioritization on Packet Duplication," (hereinafter referred to as "62/615,497 application"). The disclosure of the 62/615,497 application is hereby incorporated fully by reference into the present application.

FIELD

The present disclosure generally relates to wireless communications, and more particularly, to methods and devices for Packet Data Convergence Protocol (PDCP) duplication in wireless communication systems.

BACKGROUND

Various efforts have been made to improve the performances of wireless communications, such as data rate, latency, reliability and mobility, for the next generation (e.g., 5G New Radio (NR)) wireless communication systems. Among these goals, the next generation wireless communication systems introduce a function of PDCP duplication to achieve higher reliability on data transmission.

With the PDCP duplication, a transmitting device may increase the probability that the corresponding receiving device successfully receives the data. However, the details on how to apply the PDCP duplication in the wireless communication systems have not been extensively discussed. Thus, improvements are needed in the art.

SUMMARY

The present disclosure is directed to methods and devices for the PDCP duplication in the wireless communication systems.

According to an aspect of the present disclosure, a method performed by a User Equipment (UE) is provided. The UE includes a PDCP entity associated with two Radio Link Control (RLC) entities, and the PDCP entity is configured with a duplication function and the duplication function is not activated. The method includes determining, by the PDCP entity, whether the two RLC entities belong to a same cell group, and submitting, by the PDCP entity, a PDCP Protocol Data Unit (PDU) (e.g., PDCP Data PDU) to a primary RLC entity of the two RLC entities when the two RLC entities belong to the same cell group.

According to another aspect of the present disclosure, a UE is provided. The UE includes a one or more non-transitory computer-readable media having computer-executable instructions embodied thereon and at least one processor coupled to the one or more non-transitory computer-readable media. The at least one processor is configured to execute the computer-executable instructions to configure a PDCP entity associated with two RLC entities, where the PDCP entity is configured with a duplication function and the duplication function is not activated, determine whether the two RLC entities belong to a same cell group, and submit a PDCP PDU (e.g., PDCP Data PDU) to a primary RLC entity of the two RLC entities when the two RLC entities belong to the same cell group.

BRIEF DESCRIPTION OF THE DRAWINGS

Aspects of the exemplary disclosure are best understood from the following detailed description when read with the accompanying figures. Various features are not drawn to scale. Dimensions of various features may be arbitrarily increased or reduced for clarity of discussion.

DETAILED DESCRIPTION

Figure 1A:
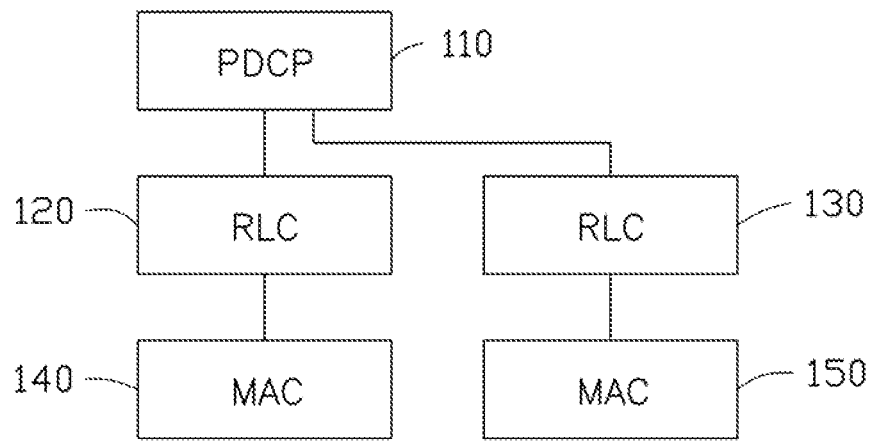
FIG. 1A shows an illustrative example of the Dual Connectivity (DC) architecture.

The following description contains specific information pertaining to example implementations in the present disclosure. The drawings in the present disclosure and their accompanying detailed description are directed to merely example implementations. However, the present disclosure is not limited to merely these example implementations. Other variations and implementations of the present disclosure will occur to those skilled in the art. Unless noted otherwise, like or corresponding elements among the figures may be indicated by like or corresponding reference numerals. Moreover, the drawings and illustrations in the present disclosure are generally not to scale, and are not intended to correspond to actual relative dimensions.

For the purpose of consistency and ease of understanding, like features are identified (although, in some examples, not shown) by numerals in the example figures. However, the features in different implementations may be differed in other respects, and thus shall not be narrowly confined to what is shown in the figures.

References to "one implementation," "an implementation," "example implementation," "various implementations," "some implementations," "implementations of the present application," etc., may indicate that the implementation(s) of the present application so described may include a particular feature, structure, or characteristic, but not every possible implementation of the present application necessarily includes the particular feature, structure, or characteristic. Further, repeated use of the phrase "in one implementation," or "in an example implementation," "an implementation," do not necessarily refer to the same implementation, although they may. Moreover, any use of phrases like "implementations" in connection with "the present application" are never meant to characterize that all implementations of the present application must include the particular feature, structure, or characteristic, and should instead be understood to mean "at least some implementations of the present application" includes the stated particular feature, structure, or characteristic. The term "coupled" is defined as connected, whether directly or indirectly through intervening components, and is not necessarily limited to physical connections. The term "comprising," when utilized, means "including, but not necessarily limited to"; it specifically indicates open-ended inclusion or membership in the so-described combination, group, series and the equivalent.

Additionally, for the purposes of explanation and non-limitation, specific details, such as functional entities, techniques, protocols, standard, and the like are set forth for providing an understanding of the described technology. In other examples, detailed description of well-known methods, technologies, system, architectures, and the like are omitted so as not to obscure the description with unnecessary details.

Persons skilled in the art will immediately recognize that any network function(s) or algorithm(s) described in the present disclosure may be implemented by hardware, software or a combination of software and hardware. Described functions may correspond to modules that may be software, hardware, firmware, or any combination thereof. The software implementation may comprise computer executable instructions stored on computer readable medium such as memory or other type of storage devices. For example, one or more microprocessors or general purpose computers with communication processing capability may be programmed with corresponding executable instructions and carry out the described network function(s) or algorithm(s). The microprocessors or general purpose computers may be formed of Applications Specific Integrated Circuitry (ASIC), programmable logic arrays, and/or using one or more digital signal processor (DSPs). Although some of the example implementations described in this specification are oriented to software installed and executing on computer hardware, nevertheless, alternative example implementations implemented as firmware or as hardware or combination of hardware and software are well within the scope of the present disclosure.

The computer readable medium includes but is not limited to random access memory (RAM), read only memory (ROM), erasable programmable read-only memory (EPROM), electrically erasable programmable read-only memory (EEPROM), flash memory, compact disc read-only memory (CD ROM), magnetic cassettes, magnetic tape, magnetic disk storage, or any other equivalent medium capable of storing computer-readable instructions.

A radio communication network architecture (e.g., a long term evolution (LTE) system, an LTE-Advanced (LTE-A) system, or an LTE-Advanced Pro system) typically includes at least one base station, at least one UE, and one or more optional network elements that provide connection towards a network. The UE communicates with the network (e.g., a CN, an evolved packet core (EPC) network, an Evolved Universal Terrestrial Radio Access network (E-UTRAN), a Next-Generation Core (NGC), or an internet), through a radio access network (RAN) established by the base station.

It should be noted that, in the present application, a UE may include, but is not limited to, a mobile station, a mobile terminal or device, a user communication radio terminal. For example, a UE may be a portable radio equipment, which includes, but is not limited to, a mobile phone, a tablet, a wearable device, a sensor, or a Personal Digital Assistant (PDA) with wireless communication capability. The UE is configured to receive and transmit signals over an air interface to one or more cells in a radio access network.

A base station may include, but is not limited to, a node B (NB) as in the Universal Mobile Telecommunication System (UMTS), an evolved node B (eNB) as in the LTE-A, a Radio Network Controller (RNC) as in the UMTS, a Base Station Controller (BSC) as in the Global System for Mobile communications (GSM)/GSM EDGE Radio Access Network (GERAN), an ng-eNB as in an E-UTRA base station in connection with the SGC, a next generation node B (gNB) as in the 5G Access Network (5G-AN), and any other apparatus capable of controlling radio communication and managing radio resources within a cell. The base station may connect to serve the one or more UEs through a radio interface to the network.

A base station may be configured to provide communication services according to at least one of the following Radio Access Technologies (RATs): Worldwide Interoperability for Microwave Access (WiMAX), GSM (often referred to as 2G), GERAN, General Packet Radio Service (GRPS), UMTS (often referred to as 3G) based on basic Wideband-Code Division Multiple Access (W-CDMA), High-Speed Packet Access (HSPA), LTE, LTE-A, eLTE, NR (often referred to as 5G), and LTE-A Pro. However, the scope of the present application should not be limited to the above mentioned protocols.

The base station is operable to provide radio coverage to a specific geographical area using a plurality of cells forming the radio access network. The base station supports the operations of the cells. Each cell is operable to provide services to at least one UE within its radio coverage. More specifically, each cell (often referred to as a serving cell) provides services to serve one or more UEs within its radio coverage, (e.g., each cell schedules the downlink and optionally uplink resources to at least one UE within its radio coverage for downlink and optionally uplink packet transmissions). The base station can communicate with one or more UEs in the radio communication system through the plurality of cells. A cell may allocate sidelink (SL) resources for supporting proximity service (ProSe). Each cell may have overlapped coverage areas with other cells. In MR-DC cases, the primary cell of an MCG or an SCG may be called as SpCell. PCell may refer to the SpCell of an MCG. PSCell may refer to the SpCell of an SCG. MCG means a group of serving cells associated with the MN, comprising of the SpCell and optionally one or more secondary cells (SCells). SCG means a group of serving cells associated with the SN, comprising of the SpCell and optionally one or more SCells.

As discussed above, the frame structure for NR is to support flexible configurations for accommodating various next generation (e.g., 5G) communication requirements, such as enhanced mobile broadband (eMBB), massive machine type communication (mMTC), ultra-reliable communication and low latency communication (URLLC), while fulfilling high reliability, high data rate and low latency requirements. The orthogonal frequency-division multiplexing (OFDM) technology as agreed in 3GPP may serve as a baseline for NR waveform. The scalable OFDM numerology, such as the adaptive sub-carrier spacing, the channel bandwidth, and the Cyclic Prefix (CP), may also be used. Additionally, two coding schemes are considered for NR: (1) low-density parity-check (LDPC) code and (2) Polar Code. The coding scheme adaption may be configured based on the channel conditions and/or the service applications.

Moreover, it is also considered that in a transmission time interval TX of a single NR frame, a downlink (DL) transmission data, a guard period, and an uplink (UL) transmission data should at least be included, where the respective portions of the DL transmission data, the guard period, the UL transmission data should also be configurable, for example, based on the network dynamics of NR. In addition, sidelink resource may also be provided in an NR frame to support ProSe services.

The term "and/or" herein is only an association relationship for describing associated objects, and represents that three relationships may exist, for example, A and/or B may represent that: A exists alone, A and B exist at the same time, and B exists alone. In addition, the character "/" used herein generally represents that the former and latter associated objects are in an "or" relationship.

Furthermore, combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims.

PDCP duplication can be used to increase the reliability for data transmission. The PDCP duplication may refer to an operation of sending the same PDCP PDU multiple times to a plurality of RLC entities. For example, the PDCP entity may perform the PDCP duplication by submitting a PDCP PDU to two RLC entities. When the PDCP duplication is configured for a radio bearer by Radio Resource Control (RRC) signaling, an additional RLC entity and an additional/duplicated Logical Channel (LCH) are added for the radio bearer to handle the duplicated PDCP PDU(s).

Figure 1B:
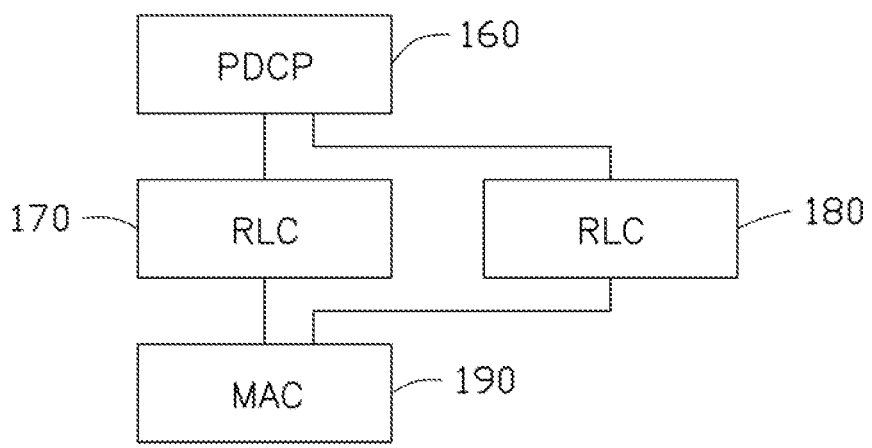
FIG. 1B shows an illustrative example of the Carrier Aggregation (CA) architecture.

The PDCP duplication can be applied based on a Dual Connectivity (DC) architecture or a Carrier Aggregation (CA) architecture, depending on whether the LCHs associated with the two RLC entities belong to different MAC entities. Illustrative examples of the DC and CA architectures are shown in FIGS. 1A and 1B, respectively. As shown in FIG. 1A, for the DC architecture, a PDCP entity 110 is associated with two RLC entities 120 and 130, and the LCHs (illustrated as the solid lines between the RLC layer and the MAC layer in FIG. 1A) associated with the two RLC entities 120 and 130 belong to different MAC entities 140 and 150. As shown in FIG. 1B, for the CA architecture, a PDCP entity 160 is associated with two RLC entities 170 and 180, and the LCHs (illustrated as the solid lines between the RLC layer and the MAC layer in FIG. 1B) associated with the two RLC entities 170 and 180 belong to the same MAC entity 190.

Among the two RLC entities associated with the PDCP entity, one of the RLC entities is the primary RLC entity and the other one is the secondary RLC entity. The primary RLC entity may refer to an RLC entity associated with an LCH that is indicated by a specific Information Element (IE) (e.g., primaryPath) contained in the moreThanOneRLC IE of the RRC message (e.g., RRCReconfiguration or RRCSetup) from the base station (e.g., gNB). The secondary RLC entity may refer to an RLC entity associated with an LCH that is not indicated by the specific IE (e.g., primaryPath). For the CA architecture, a MAC entity may apply certain LCH mapping restrictions (e.g., allowedServing Cells which sets the allowed cell(s) for MAC PDU transmission) to ensure that the LCH carrying the original PDCP PDU(s) and the LCH carrying the corresponding duplicated PDCP PDU(s) are sent over different carriers.

It should be noted that although only two RLC entities are shown in FIGS. 1A and 1B, the present disclosure is not limited thereto Implementations of the present disclosure can be extended to various protocol architectures that may include one or more than one RLC entity (e.g., in Multi Connectivity (MC) architecture).

At the UE side, the function of PDCP duplication (hereafter referred to "duplication function") is configurable by the base station. For example, if the UE's PDCP entity is configured with the duplication function, the duplication function can be activated or deactivated per Dedicated Radio Bearer (DRB) through a specific MAC Control Element (CE) from the base station. For the CA architecture, when the duplication function is deactivated (or called "not activated"), the LCH mapping restrictions may be lifted. For the DC architecture, the UE may apply certain MAC CE commands regardless of their origin (a Master Cell Group (MCG) or a Secondary Cell Group (SCG)).

Figure 2:
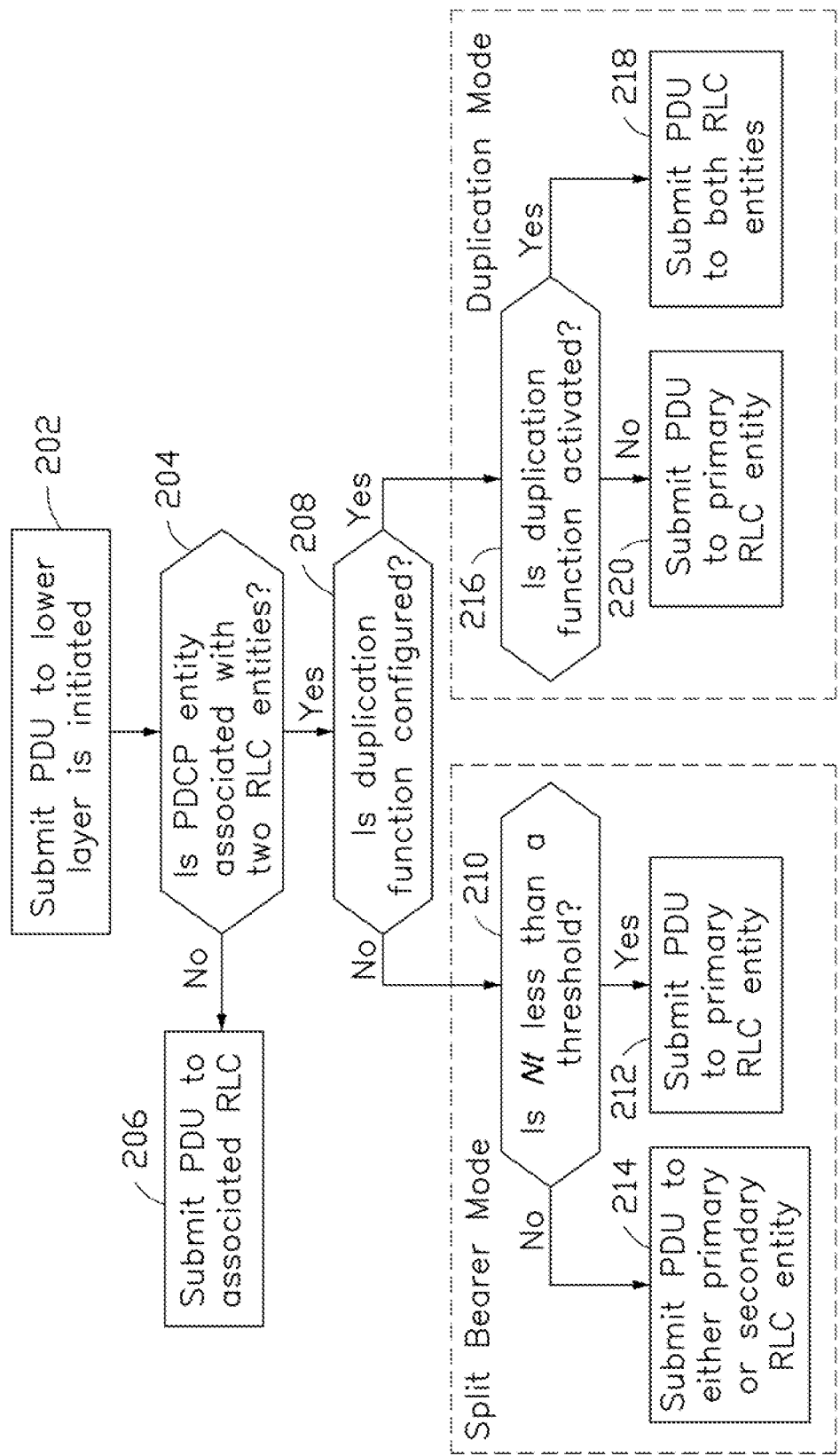
FIG. 2 is a flowchart illustrating a procedure of submitting PDCP PDUs to the lower layer.

FIG. 2 is a flowchart illustrating a procedure of submitting PDCP PDUs to the lower layer. According to FIG. 2, once the PDCP entity is associated with two RLC entities, the PDCP entity can be operated in two different data transmitting modes: the duplication mode or the split bearer mode, depending on whether the PDCP entity is configured with the duplication function.

As shown in FIG. 2, in action 202, the PDCP entity initiates the procedure of submitting PDCP PDUs (e.g., PDCP Data PDUs) to the lower layer (e.g., RLC layer).

In action 204, the PDCP entity determines whether it is associated with two RLC entities (or multiple RLC entities).

In action 206, when the PDCP entity is not associated with two RLC entities (or multiple RLC entities), it means the PDCP entity may be associated with only one RLC entity. Thus, the PDCP entity may directly submit the PDCP PDU to the associated RLC entity.

In action 208, when the PDCP entity is associated with two RLC entities (or multiple RLC entities), the PDCP entity may then determine whether the duplication function is configured. For example, the PDCP entity may check whether it is configured with a specific IE (e.g., pdcp-Duplication IE or ul-Duplication IE) by the base station. If the PDCP entity is configured with the specific IE (e.g., pdcp-Duplication or ul-Duplication), it may mean that the PDCP entity is configured with the duplication function. Otherwise, the PDCP entity may not be configured with the duplication function.

In the present implementation, once the PDCP entity is associated with two RLC entities, the PDCP entity may be operated in the duplication mode when the PDCP entity is configured with the duplication function, and may be operated in the split bearer mode when the PDCP entity is not configured with the duplication function.

When operated in the split bearer mode, the PDCP entity may determine to which RLC entity the PDCP PDU should be sent, based on certain data volume considerations. For example, the PDCP entity may submit the PDCP PDU to one of the two associated RLC entities in response to a comparison result obtained from the PDCP entity comparing a data volume (Nt) with a threshold. The data volume Nt may be represented as, for example, the total amount of the PDCP data available (or pending) in the PDCP entity and the RLC data available (or pending) in the two associated RLC entities for initial transmission. The threshold may be indicated as a specific IE, such as the ul-DataSplitThreshold IE contained in the moreThanOneRLC IE. It should be noted that the split bearer mode may support the DC architecture but not the CA architecture. This is because, in some implementations, in the CA architecture, the two RLC entities (or multiple RLC entities) are associated with one MAC entity.

As shown in FIG. 2, in action 210, the PDCP entity may determine whether Nt is less than a threshold (e.g., ul-DataSplitThreshold). In action 212, if Nt is less than the threshold, the PDCP entity may submit the PDCP PDU to the primary RLC. Otherwise, in action 214, the PDCP entity may submit the PDCP PDU to either the primary RLC entity or the secondary RLC entity, depending on one or more predefined rules or regulations.

On the other hand, when operated in the duplication mode, the PDCP entity may determine whether to execute the duplication function according to the duplication function status (e.g., whether the duplication function is activated or not).

As shown in FIG. 2, in action 216, the PDCP may determine whether the duplication function is activated. For example, the activation/deactivation of the duplication function may be controlled by the base station through a specific MAC CE. In action 218, if the duplication function is activated, the PDCP entity may submit the PDCP PDU to all of the associated RLC entities. For example, the PDCP entity may duplicate the PDCP PDU and submit the PDCP PDU and its duplicate to the two associated RLC entities, respectively. In action 220, if the duplication function is not activated, the PDCP entity may submit the PDCP PDU only to the primary RLC entity.

However, according to FIG. 2, once the PDCP entity is configured with the duplication function, the PDCP entity may only be operated in the duplication mode and may not fall back to the split bearer mode, even though the duplication function is deactivated by the base station (e.g., through a duplication deactivation MAC CE). In such a situation, even if the UE is configured with the DC architecture, the PDCP PDU may only be submitted to the primary RLC entity when the duplication function is deactivated, resulting in a potential overloading of the primary path from the primary RLC entity to its associated MAC entity.

According to some implementations of the present disclosure, an improved procedure of submitting PDCP PDUs to the lower layer is provided. With the improved procedure, a UE configured with the DC architecture may be effectively switched from the duplication mode to the split bearer mode when the duplication function is configured, but not activated.

Figure 3:
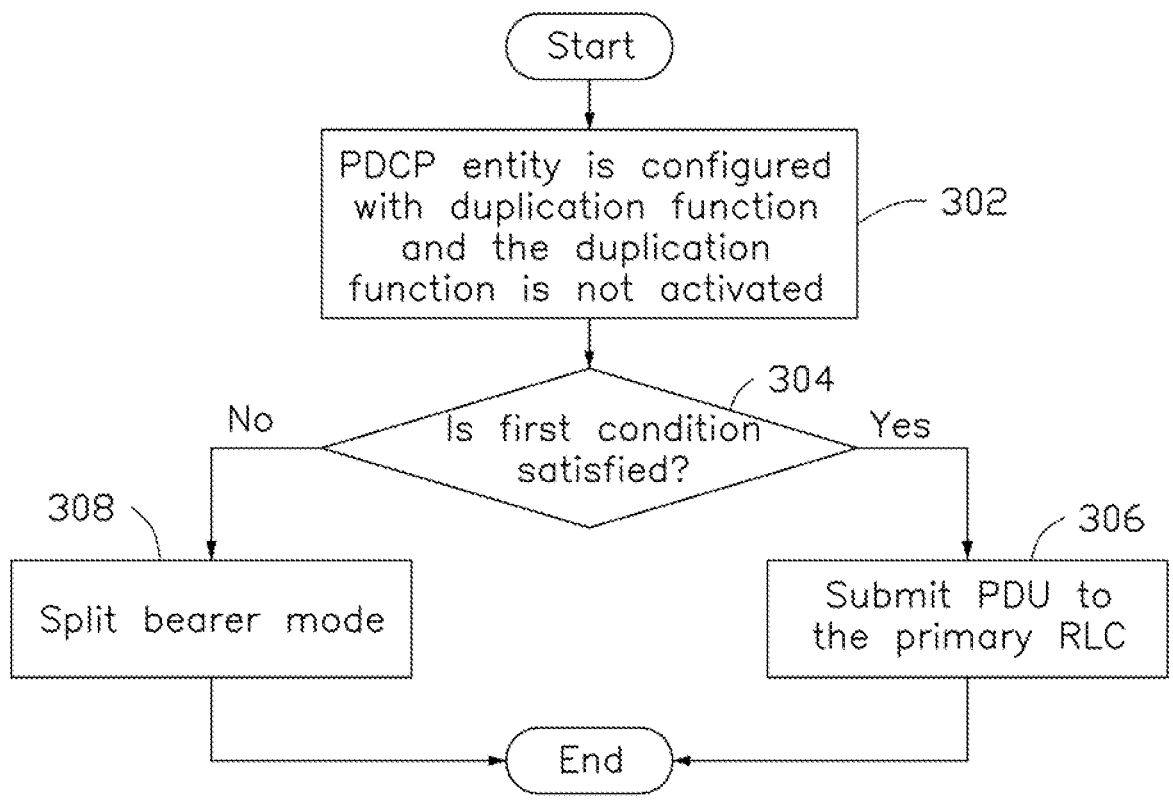
FIG. 3 is a flowchart illustrating a procedure of submitting PDCP PDUs to the lower layer, in accordance with an example implementation of the present disclosure.

FIG. 3 is a flowchart illustrating a procedure of submitting PDCP PDUs to the lower layer, in accordance with an implementation of the present disclosure. The procedure may be performed by, for example, a UE including a PDCP entity associated with two RLC entities (or multiple RLC entities).

As shown in FIG. 3, in action 302, the PDCP entity may be configured with the duplication function (e.g., configured with the ul-Duplication (or pdcp-Duplication) IE) and the duplication function may not be activated.

In action 304, the PDCP entity may determine whether a first condition is satisfied. If yes, action 306 may be performed. Otherwise, action 308 may be performed.

In one implementation, the first condition may be the two RLC entities (or multiple RLC entities) associated with the PDCP entity belonging to the same cell group (or MAC entity). In another implementation, the first condition may be the PDCP entity not being configured with a specific IE (e.g., ul-DataSplitThreshold). In yet another implementation, the first condition may be the PDCP entity being configured with the ul-DataSplitThreshold IE, and the ul-DataSplitThreshold IE having a value (e.g., a system maximum value) that is ensured to be always greater than the data volume Nt. In still another implementation, the first condition may be the PDCP entity ignoring a specific IE (e.g., ul-Duplication or pdcp-Duplication).

In action 306, when the first condition is satisfied, the PDCP entity may submit the PDCP PDU (e.g., PDCP Data PDU) to the primary RLC entity.

In action 308, when the first condition is not satisfied, the PDCP entity may enter the split bearer mode, in which the PDCP PDU is submitted to the primary RLC entity or the secondary RLC entity, depending on certain data volume considerations.

For comprehension, illustrative procedures of submitting PDCP PDUs to the lower layer are next described with reference to FIGS. 4, 5 and 6. For simplicity of the description, the illustrative procedures consider no more than two RLC entities. However, it should be understood that the illustrative procedures may also be applied to the cases that the PDCP entity is associated with a plurality of RLC entities.

Figure 4:
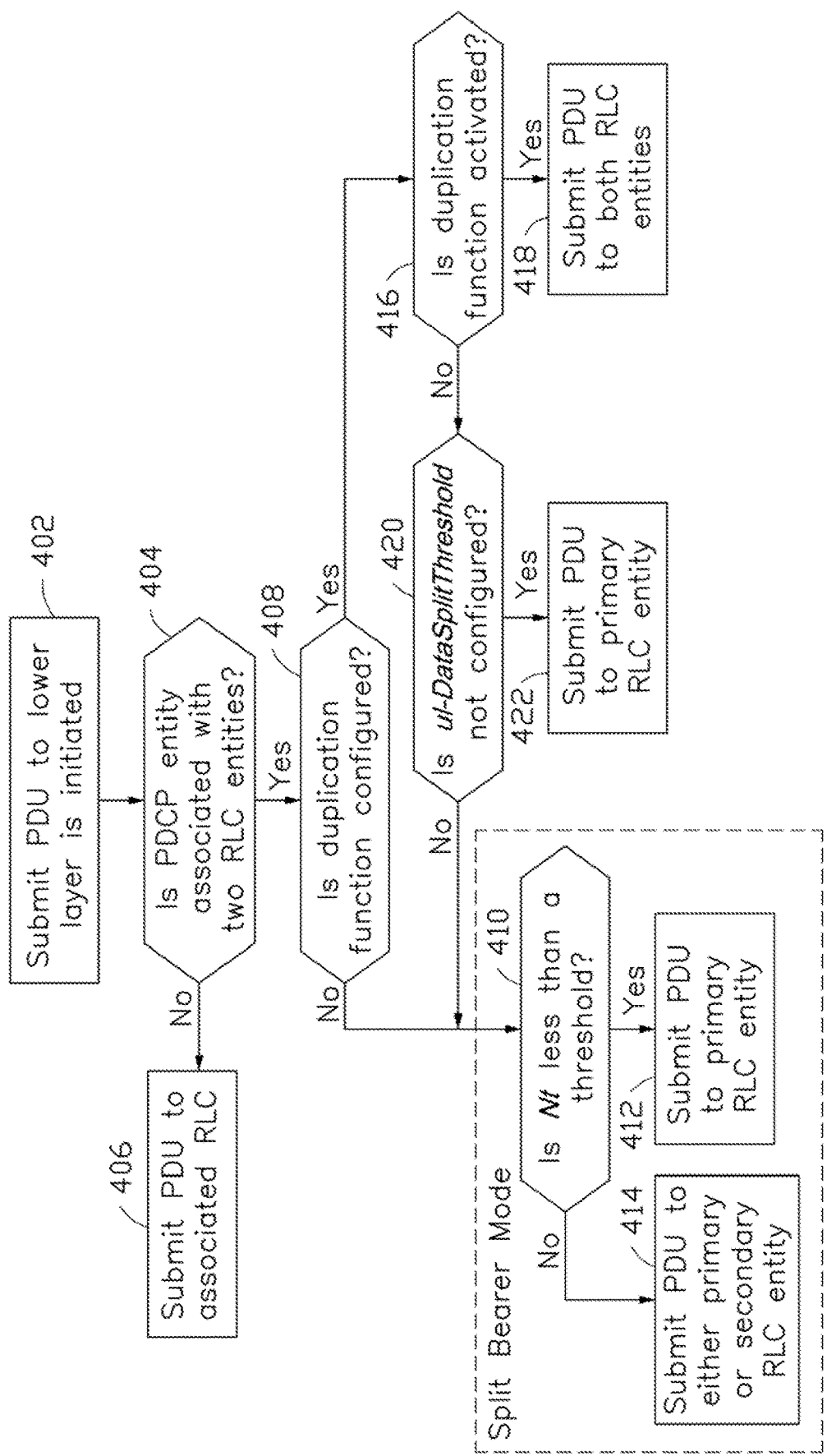
FIG. 4 is a flowchart illustrating a procedure of submitting PDCP PDUs to the lower layer, in accordance with an example implementation of the present disclosure.

FIG. 4 is a flowchart illustrating a procedure of submitting PDCP PDUs to the lower layer, in accordance with an implementation of the present disclosure.

As shown in FIG. 4, in action 402, the PDCP entity initiates the procedure of submitting PDCP PDUs (e.g., PDCP Data PDUs) to the lower layer (e.g., RLC layer).

In action 404, the PDCP entity determines whether it is associated with two RLC entities.

In action 406, when the PDCP entity is not associated with two RLC entities, which means that the PDCP entity may be associated with only one RLC entity, the PDCP entity may submit the PDCP PDU to the associated RLC entity.

In action 408, when the PDCP entity is associated with two RLC entities, the PDCP entity may then determine whether the duplication function is configured. For example, the PDCP entity may check whether it is configured with the pdcp-Duplication (or ul-Duplication) IE. If the PDCP entity is configured with the pdcp-Duplication (or ul-Duplication) IE, it means that the PDCP entity is configured with the duplication function. Otherwise, the PDCP entity is not configured with the duplication function.

As mentioned above, the PDCP entity may be operated in the split bearer mode when the PDCP entity is not configured with the duplication function. As shown in FIG. 4, in action 410, the PDCP entity may determine whether the data volume Nt is less than a threshold (e.g., ul-DataSplitThreshold). If Nt is less than the threshold, in action 412, the PDCP entity may submit the PDCP PDU to the primary RLC entity.

Otherwise, in action 414, the PDCP entity may submit the PDCP PDU to either the primary RLC entity or the secondary RLC entity, depending on the predefined rules or regulations.

On the other hand, in action 416, when the PDCP entity is configured with the duplication function, the PDCP entity may determine whether the configured duplication function is activated or not.

In action 418, if the duplication function is activated, the PDCP entity may perform the duplication function, in which the PDCP PDU may be submitted to the two RLC entities.

In action 420, the PDCP entity may determine whether it is configured with the ul-DataSplitThreshold IE. If yes, action 422 is performed, in which the PDCP entity may submit the PDCP PDU to the primary RLC entity. Otherwise, the procedure may fall back to the split bearer mode.

In the present implementation, the ul-DataSplitThreshold IE can be optionally configured by the base station. Once the UE receives the duplication deactivation MAC CE from the base station and deactivates the duplication function accordingly, the UE may evaluate whether it should fall back to the split bearer mode based on whether the ul-DataSplitThreshold IE exists. Thus, when the base station decides to configure the UE to be operated in the duplication mode under the CA architecture (hereafter referred to as "duplication mode CA case"), the base station may reconfigure the moreThanOneRLC IE without appending the ul-DataSplitThreshold IE to the UE. On the other hand, when the base station decides to configure the UE to be operated in the duplication mode under the DC architecture (hereafter referred to as "duplication mode DC case"), the base station may append the ul-DataSplitThreshold IE to the UE for supporting the falling back mechanism to the split bearer mode when the duplication function is deactivated.

In another implementation, the base station may always append the ul-DataSplitThreshold IE in the moreThanOneRLC IE to the UE. The PDCP entity may determine whether the data volume Nt is less than ul-DataSplitThreshold when the PDCP entity is configured with the duplication function and the duplication function is not activated. Similar to the operation in the split bearer mode, the PDCP entity may submit the PDCP PDU to the primary RLC entity when the data volume Nt is less than ul-DataSplitThreshold, and submit the PDCP PDU to either the primary RLC entity or the secondary RLC entity when the data volume Nt is more than, or equal to, ul-DataSplitThreshold. Thus, if the UE is to be operated in the duplication mode CA case, the base station may configure the ul-DataSplitThreshold IE with a special value that may be ensured to be always greater than the data volume Nt, so that the PDCP PDU may always be submitted to the primary RLC entity under the CA architecture. On the other hand, if the UE is to be operated in the duplication mode DC case, the base station may configure the ul-DataSplitThreshold IE with a normal value (which may be greater/less than the data volume Nt), so that the PDCP PDU may be submitted to either the primary RLC entity or the secondary RLC entity, depending on the predefined rules or regulations.

Figure 5:
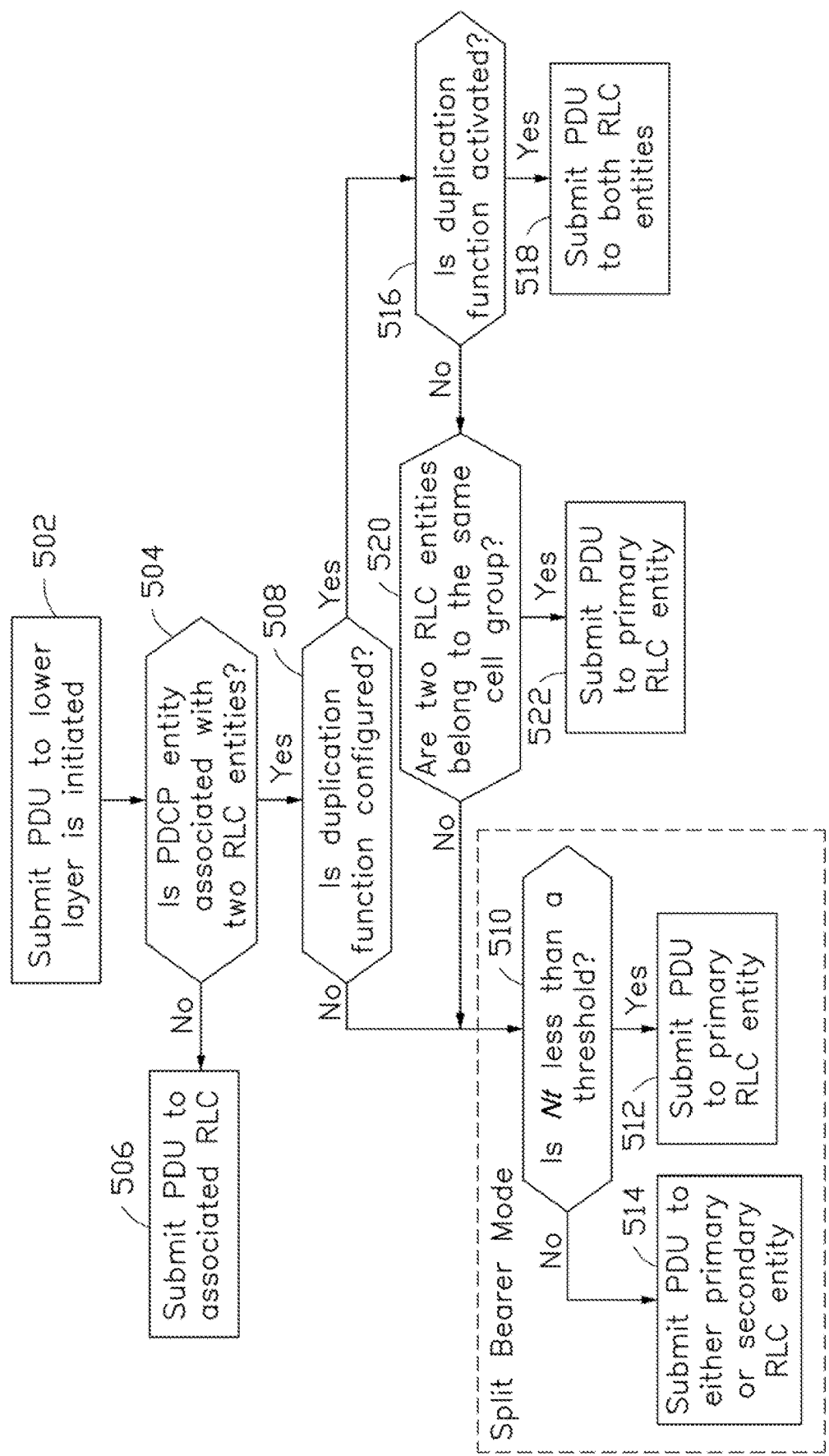
FIG. 5 is a flowchart illustrating a procedure of submitting PDCP PDUs to the lower layer, in accordance with an example implementation of the present disclosure.

FIG. 5 is a flowchart illustrating a procedure of submitting PDCP PDUs to the lower layer, in accordance with an implementation of the present disclosure.

As shown in FIG. 5, in action 502, the PDCP entity initiates the procedure of submitting PDCP PDUs (e.g., PDCP Data PDUs) to the lower layer (e.g., RLC layer).

In action 504, the PDCP entity may determine whether it is associated with two RLC entities.

In action 506, when the PDCP entity is not associated with two RLC entities, which means that the PDCP entity may be associated with only one RLC entity, the PDCP entity may directly submit the PDCP PDU to the associated RLC entity.

In action 508, when the PDCP entity is associated with (at least) two RLC entities, the PDCP entity may then determine whether the duplication function is configured. For example, the PDCP entity may check whether it is configured with the pdcp-Duplication (or ul-Duplication) IE by the base station. If the PDCP entity is configured with the pdcp-Duplication (or ul-Duplication) IE, it means that the PDCP entity may be configured with the duplication function. Otherwise, the PDCP entity may not be configured with the duplication function.

The PDCP entity may be operated in the split bearer mode when the PDCP entity is not configured with the duplication function. As shown in action 510, the PDCP entity may determine whether the data volume Nt is less than a threshold (e.g., ul-DataSplitThreshold). If yes, in action 512, the PDCP entity may submit the PDCP PDU to the primary RLC entity. Otherwise, in action 514, the PDCP entity may submit the PDCP PDU to either the primary RLC entity or the secondary RLC entity, depending on the predefined rules or regulations.

In action 516, the PDCP entity may determine whether the duplication function is activated.

In action 518, if the duplication function is activated, the PDCP entity may perform the duplication function, in which the PDCP PDU is submitted to the two RLC entities.

In action 520, the PDCP entity may determine whether the two associated RLC entities belong to the same cell group (e.g., belonging to the same MAC entity). If yes, it means that the UE may apply the CA architecture. Thus, in action 522, the PDCP entity may submit the PDCP PDU to the primary RLC entity. Conversely, if the two RLC entities belong to different cell groups (e.g., belonging to different MAC entities), it means that the UE may apply the DC architecture. In such a case, the procedure may fall back to the split bearer mode, as shown in the "No" path of action 520.

Figure 6:
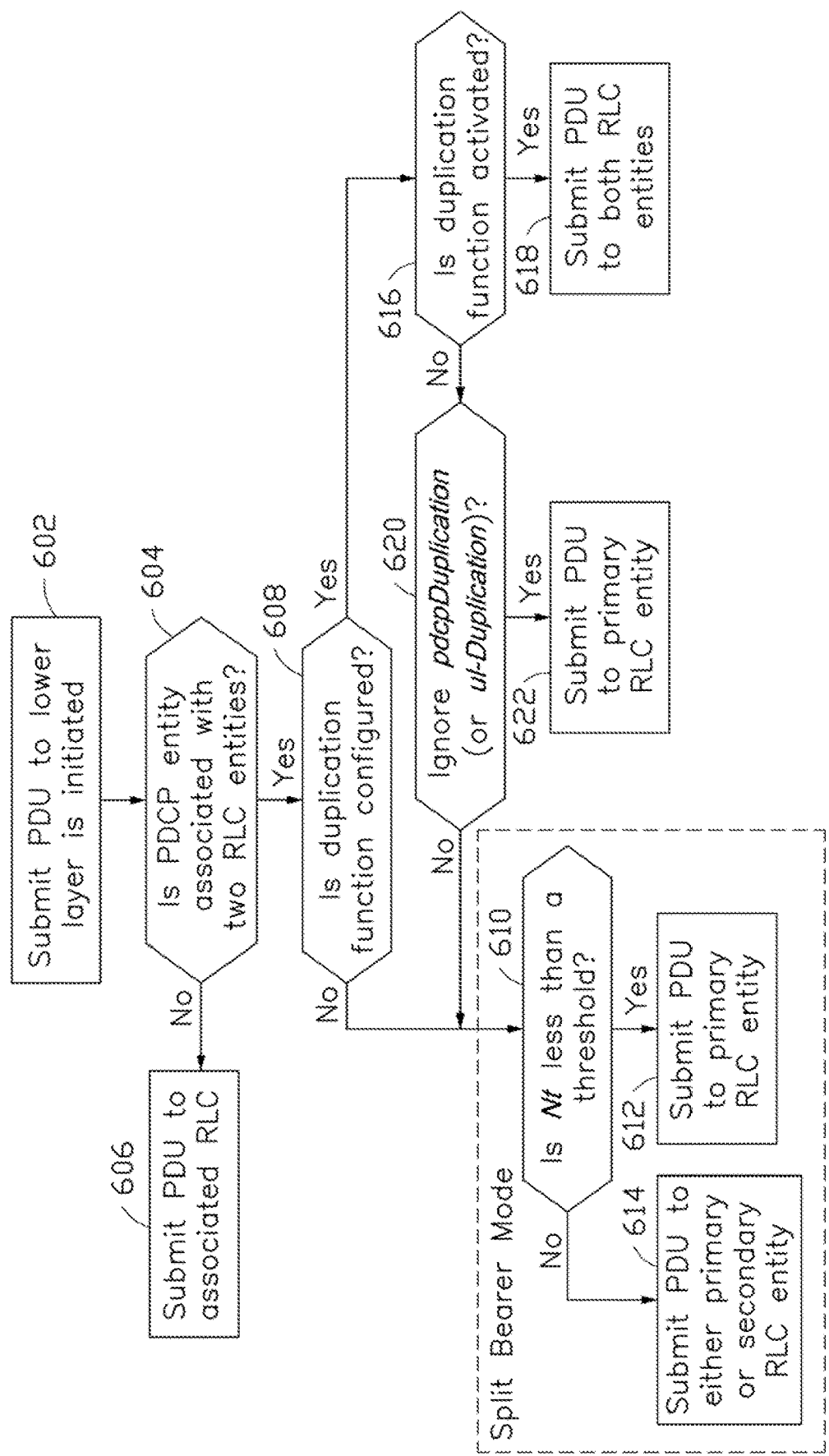
FIG. 6 is a flowchart illustrating a procedure of submitting PDCP PDUs to the lower layer, in accordance with an example implementation of the present disclosure.

FIG. 6 is a flowchart illustrating a procedure of submitting PDCP PDUs to the lower layer, in accordance with an implementation of the present disclosure.

As shown in FIG. 6, in action 602, the PDCP entity initiates the procedure of submitting PDCP PDUs (e.g., PDCP Data PDUs) to the lower layer (e.g., RLC layer).

In action 604, the PDCP entity determines whether it is associated with two (or more) RLC entities.

In action 606, when the PDCP entity is not associated with two RLC entities, which means that the PDCP entity may be associated with only one RLC entity, the PDCP entity may directly submit the PDCP PDU to the associated RLC entity.

In action 608, when the PDCP entity is associated with two RLC entities, the PDCP entity may then determine whether the duplication function is configured. For example, the PDCP entity may check whether it is configured with the pdcp-Duplication (or ul-Duplication) IE by the base station. If the PDCP entity is configured with the pdcp-Duplication (or ul-Duplication) IE, it means that the PDCP entity may be configured with the duplication function. Otherwise, the PDCP entity may not be configured with the duplication function.

The PDCP entity may be operated in the split bearer mode when the PDCP entity is not configured with the duplication function by the base station. As shown in action 610, the PDCP entity may determine whether the data volume Nt is less than a threshold (e.g., ul-DataSplitThreshold). If the outcome of action 610 is Yes (e.g., if the data volume Nt is less than the predetermined threshold), then in action 612, the PDCP entity may submit the PDCP PDU to the primary RLC entity. Otherwise, in action 614, the PDCP entity may submit the PDCP PDU to either the primary RLC entity or the secondary RLC entity, depending on the predefined rules or regulations.

In action 616, the PDCP entity may determine whether the duplication function is activated.

In action 618, if the duplication function is activated, the PDCP entity may perform the duplication function, in which the PDCP PDU may be submitted to the two RLC entities.

In action 620, the PDCP entity may determine whether to ignore the pdcp-Duplication (or ul-Duplication) IE. If yes (e.g., if the PDCP entity determines not to ignore the pdcp-Duplication (or ul-Duplication) IE), action 622 may be performed, in which the PDCP entity may submit the PDCP PDU to the primary RLC entity. Otherwise, the procedure may fall back to the split bearer mode (as described above).

In the present implementation, the duplication function of a PDCP entity configured with the duplication function may be indicated (e.g., by the lower layer) as deactivated. In such a case, the PDCP entity may ignore the pdcp-Duplication (or ul-Duplication) IE, so that the UE may treat the PDCP entity as if it is not configured with the duplication function. In this manner, even though the PDCP entity has been configured with the duplication function, the PDCP entity may be operated in the split bearer mode.

In another implementation, the base station may configure the UE with a plurality of LCH configurations (e.g., LCH-Configs) associated with a single PDCP entity. The base station may indicate a specific LCH as the primary path (e.g., indicated by the primaryPath IE) for the split bearer mode, and indicate another LCH as another primary path for the duplication mode. Take FIG. 2 as an example, actions 212 and 220 may correspond to different primary paths for submitting the PDCP PDUs (e.g., PDCP Data PDUs). In addition, the base station may indicate the LCH(s) applied for the data transmission once the PDCP entity is operated in the duplication mode. The base station may also indicate the LCH(s) applied for the data transmission once the PDCP is operated in the split bearer mode. The LCH indications mentioned above may be included in the PDCP-Config IE or other RRC messages or IEs.

According to another aspect of the present disclosure, an improved procedure of PDCP data volume indication is provided. The procedure of PDCP data volume indication may be initiated in response to a Buffer Status Report (BSR) procedure. The BSR procedure is an uplink radio resource requesting procedure triggered by the MAC entity of a UE. For example, when the UE has uplink data to transmit, the UE may initiate the BSR procedure to request the base station to allocate the required uplink radio resources. During the BSR procedure, the UE may transmit a MAC BSR CE to the base station to indicate the amount of data in the buffer for each Logical Channel Group (LCG). Once the BSR procedure is triggered, the MAC entity may ask its upper layer (e.g., the RLC layer and/or the PDCP layer) to provide the information indicating how much PDCP data and/or RLC data is queued in the buffer. In response to the request from the MAC entity, the PDCP entity may initiate the procedure of PDCP data volume indication to determine which MAC entity(ies) should be provided with the data volume related information.

Figure 7:
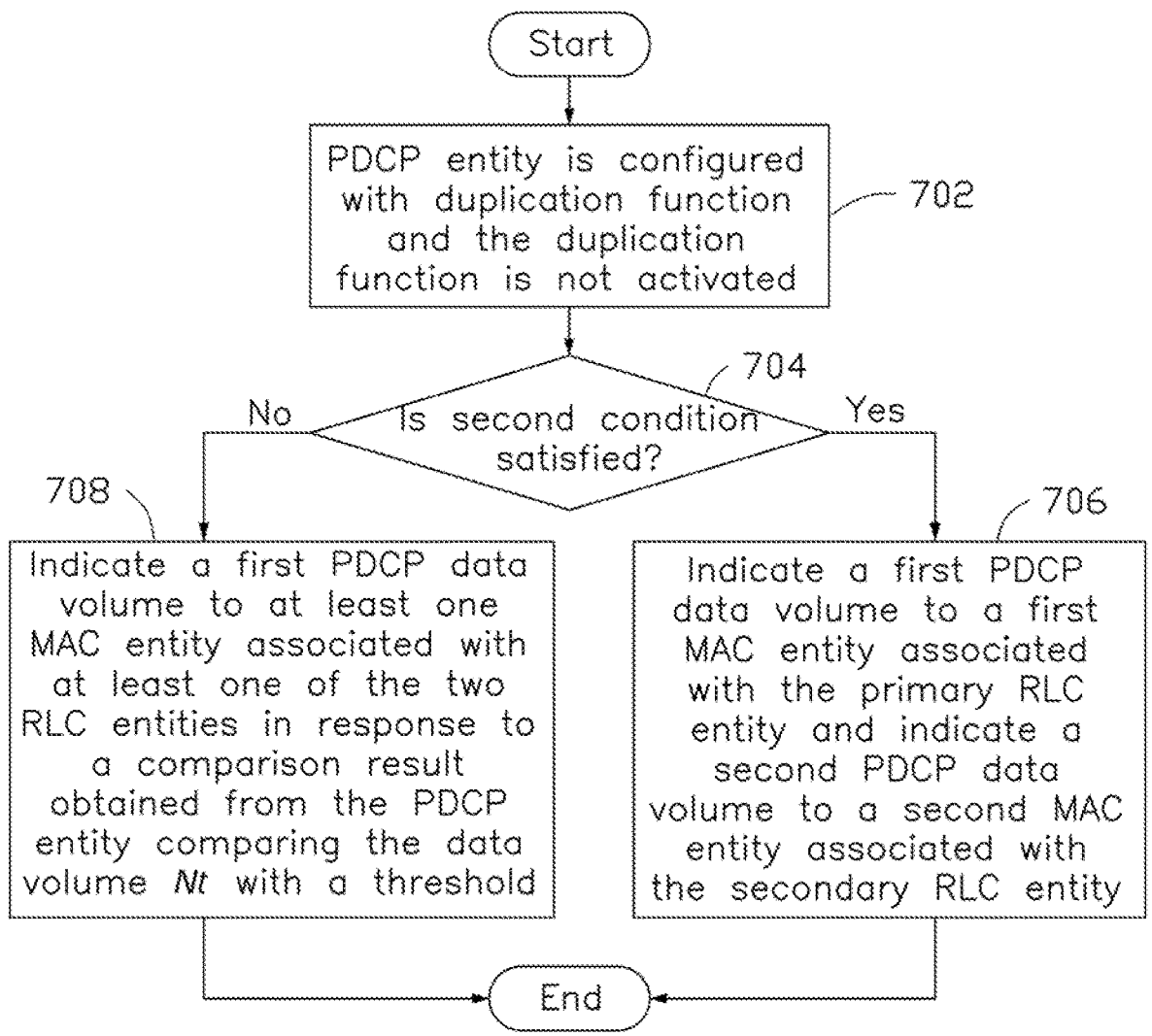
FIG. 7 is a flowchart illustrating a procedure of PDCP data volume indication, in accordance with an example implementation of the present disclosure.

FIG. 7 is a flowchart illustrating a procedure of PDCP data volume indication, in accordance with an implementation of the present disclosure. The procedure may be performed by, for example, a UE that includes a PDCP entity associated with two RLC entities (or multiple RLC entities).

As shown in FIG. 7, in action 702, the PDCP entity may be configured with the duplication function (e.g., configured with the ul-Duplication or pdcp-Duplication IE) and the duplication function may not be activated.

In action 704, the PDCP entity may determine whether a second condition is satisfied. If yes (e.g., if the second condition is satisfied), action 706 is performed. Otherwise, action 708 may be performed.

In one implementation, the second condition may be the two RLC entities associated with the PDCP entity belonging to the same cell group (e.g., the same MAC entity). In another implementation, the second condition may be the PDCP entity not being configured with a specific IE (e.g., ul-DataSplitThreshold). In yet another implementation, the second condition may be the PDCP entity being configured with the ul-DataSplitThreshold IE, and the ul-DataSplit-Threshold IE having a value (e.g., a system maximum value) that is ensured to be always greater than the data volume Nt.

In action 706, when the second condition is satisfied, the PDCP entity may indicate a first PDCP data volume to a first MAC entity associated with the primary RLC entity and indicate a second PDCP data volume to a second MAC entity associated with the secondary RLC entity. In one implementation, the calculation of the first PDCP data volume may take at least one of the following factors into consideration: 1) the PDCP Service Data Units (SDUs) for which no PDCP data PDUs have been constructed; 2) the PDCP data PDUs that have not been submitted to lower layers; 3) the PDCP data PDUs that have been duplicated but have not been submitted to lower layers; 4) the PDCP control PDUs; and 5) for Acknowledge Mode (AM) DRBs, the PDCP SDUs to be retransmitted. For the second PDCP data volume, it may be indicated as zero by the PDCP entity.

In action 708, when the second condition is not satisfied, the PDCP entity may indicate the first PDCP data volume to at least one MAC entity associated with at least one of the two RLC entities in response to a comparison result obtained from the PDCP entity comparing the data volume Nt with a threshold (e.g., ul-DataSplitThreshold). For example, when the data volume Nt is equal to or greater than the predefined threshold, the PDCP entity may indicate the first PDCP data volume to both of the first MAC entity and the second MAC entity. On the other hand, when the data volume Nt is less than the predefined threshold, the PDCP entity may indicate the first PDCP data volume to the first MAC entity and indicate the second PDCP data volume (which is indicated as zero by the PDCP entity) to the second MAC entity.

It should be noted that the first MAC entity and the second MAC entity described throughout the disclosure may refer to the same MAC entity (e.g., for the CA architecture) or two separate MAC entities (e.g., for the DC architecture). Thus, when the CA architecture is applied to the UE, the PDCP entity may indicate the second PDCP data volume to the second MAC entity (which refers to the same MAC entity as the first MAC entity) by, for example, not providing a PDCP data volume indication to the second MAC entity, so as to implicitly indicate a zero data volume to the second MAC entity. In such a case, the second MAC entity (which refers to the same MAC entity as the first MAC entity) may only receive the indication of the first PDCP data volume from the PDCP entity. On the other hand, when the DC architecture is applied to the UE, the PDCP entity may indicate the second PDCP data volume to the second MAC entity (which refers to a different MAC entity from the first MAC entity) by, for example, providing a PDCP data volume indication with a zero value (or any other value representing the zero data volume) to the second MAC entity.

For comprehension, illustrative procedures of PDCP data volume indication are next described with reference to FIGS. 8, 9, and 10. For simplicity of the description, the illustrative procedures consider no more than two RLC entities. However, it should be understood that the illustrative procedures may also be applied to the cases that the PDCP entity is associated with a plurality of RLC entities, wherein one of the RLC entities is the primary RLC entity and the other RLC entities are secondary RLC entities.

Figure 8:
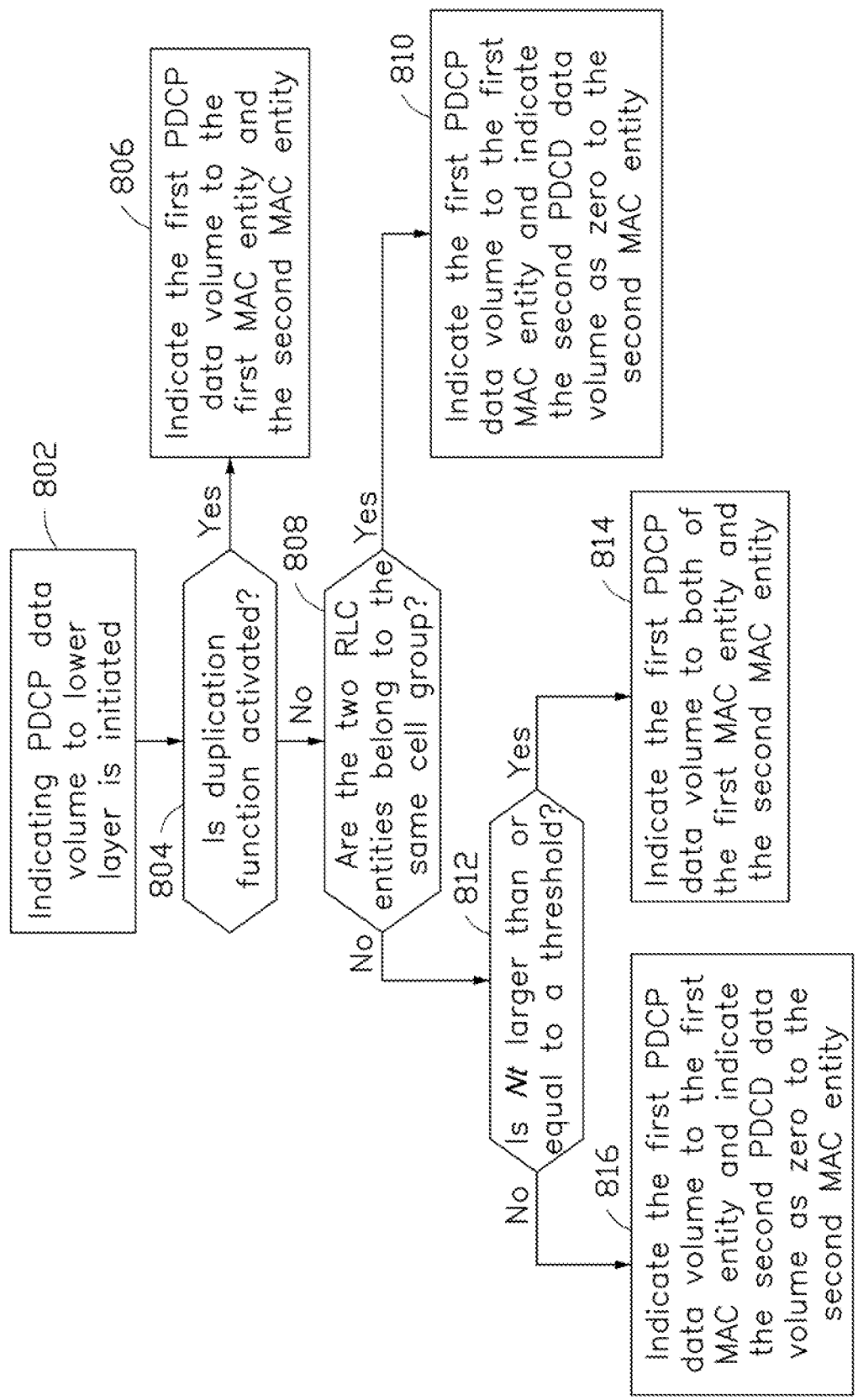
FIG. 8 is a flowchart illustrating a procedure of PDCP data volume indication, in accordance with an example implementation of the present disclosure.

FIG. 8 is a flowchart illustrating a procedure of PDCP data volume indication, in accordance with an implementation of the present disclosure. In the present implementation, the PDCP entity is associated with two RLC entities (e.g., one primary RLC entity and one secondary RLC entity) and configured with the duplication function.

In action 802, the PDCP entity initiates the procedure of PDCP data volume indication. The initiation event for the procedure may be a BSR procedure being triggered by the MAC entity.

In action 804, the PDCP entity may determine whether the duplication function is activated.

In action 806, when the duplication function is activated, the PDCP entity may indicate the first data volume to both of the first MAC entity associated with the primary RLC entity and the second MAC entity associated with the second MAC entity.

In action 808, when the duplication function is not activated, the PDCP entity may determine whether the two associated RLC entities belong to the same cell group (e.g., the same MAC entity).

In action 810, when the two RLC entities belong to the same cell group, the PDCP entity may indicate the first PDCP data volume to the first MAC entity and indicate the second PDCD data volume (which is indicated as zero by the PDCP entity) to the second MAC entity.

In action 812, when the two RLC entities belong to different cell groups (e.g., different MAC entities), the PDCP entity may further determine the data volume Nt is greater than, or equal to, a threshold (e.g., ul-DataSplit-Threshold).

In action 814, if the data volume Nt is greater than, or equal to, the threshold, the PDCP entity may indicate the first PDCP data volume to both of the first MAC entity and the second MAC entity. Otherwise (e.g., when the data volume Nt is less than the predetermined threshold), in action 816, the PDCP entity may indicate the first PDCP data volume to the first MAC entity and indicate the second PDCD data, as zero, to the second MAC entity.

Figure 9:
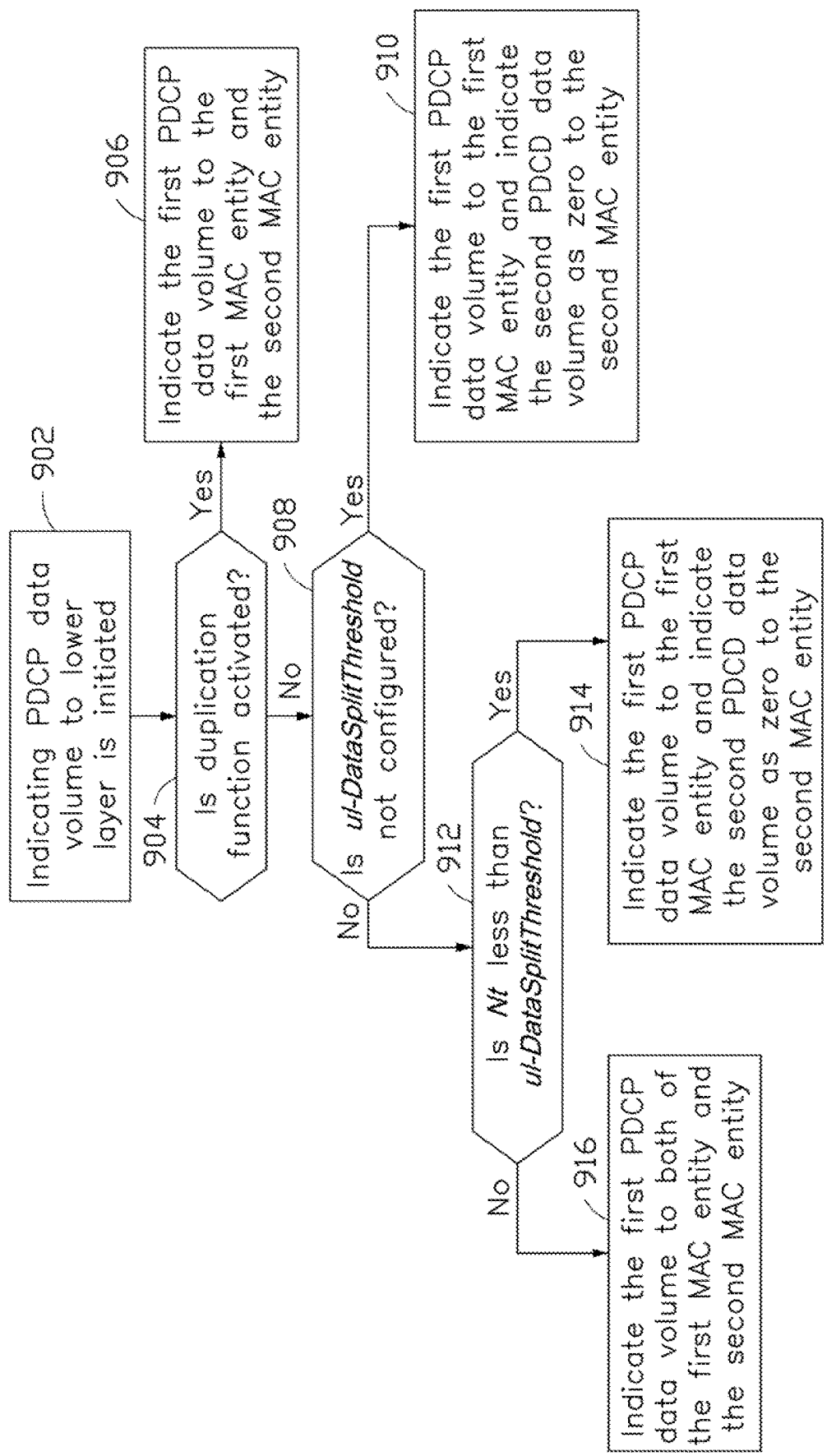
FIG. 9 is a flowchart illustrating a procedure of PDCP data volume indication, in accordance with an example implementation of the present disclosure.

FIG. 9 is a flowchart illustrating a procedure of PDCP data volume indication, in accordance with an implementation of the present disclosure. In the present implementation, the PDCP entity is associated with two RLC entities (e.g., one primary RLC entity and one secondary RLC entity) and configured with the duplication function.

In action 902, the PDCP entity initiates the procedure of PDCP data volume indication. The initiation event for the procedure may be a BSR procedure being triggered by the MAC entity.

In action 904, the PDCP entity may determine whether the duplication function is activated.

In action 906, when the duplication function is activated, the PDCP entity may indicate the first data volume to both of the first MAC entity associated with the primary RLC entity and the second MAC entity associated with the second MAC entity.

In action 908, when the duplication function is not activated, the PDCP entity may determine whether the ul-DataSplitThreshold IE is not configured.

In action 910, when the ul-DataSplitThreshold IE is not configured, the PDCP entity may indicate the first PDCP data volume to the first MAC entity and indicate the second PDCD data volume, as zero, to the second MAC entity.

In action 912, when the ul-DataSplitThreshold IE is configured, the PDCP entity may further determine whether the data volume Nt is less than ul-DataSplitThreshold.

In action 914, if the data volume Nt is less than the threshold, the PDCP entity may indicate the first PDCP data volume to the first MAC entity and indicate the second PDCD data volume, as zero, to the second MAC entity. Otherwise (e.g., when the data volume Nt is greater than, or equal to, the predetermined threshold), in action 916, the PDCP entity may indicate the first PDCP data volume to both of the first MAC entity and the second MAC entity.

Figure 10:
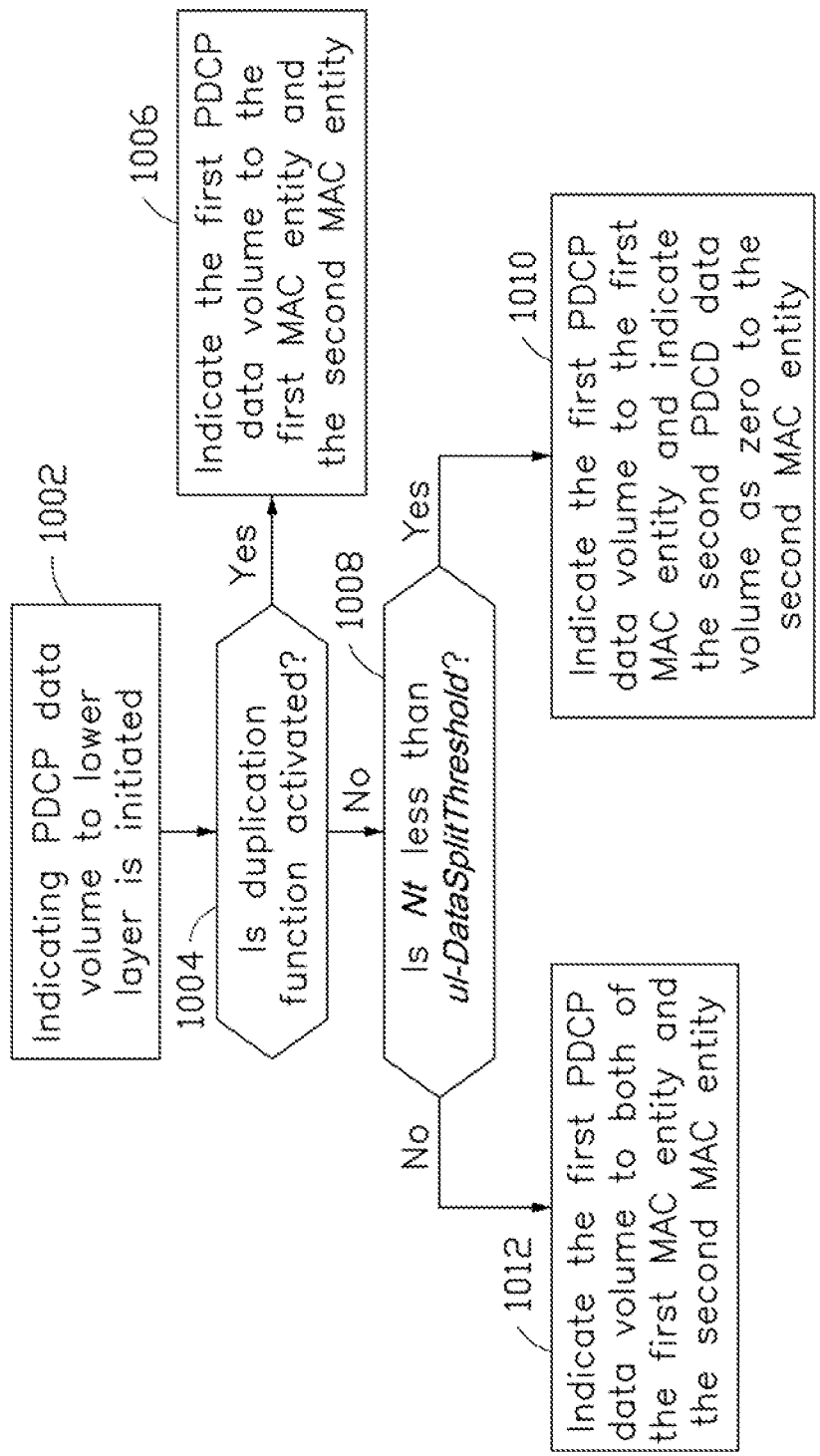
FIG. 10 is a flowchart illustrating a procedure of PDCP data volume indication, in accordance with an example implementation of the present disclosure.

FIG. 10 is a flowchart illustrating a procedure of PDCP data volume indication, in accordance with an implementation of the present disclosure. In the present implementation, the PDCP entity is associated with two RLC entities (e.g., one primary RLC entity and one secondary RLC entity) and configured with the duplication function.

In action 1002, the PDCP entity initiates the procedure of PDCP data volume indication. The initiation event for the procedure may be a BSR procedure being triggered by the MAC entity.

In action 1004, the PDCP entity may determine whether the duplication function is activated.

In action 1006, when the duplication function is activated, the PDCP entity may indicate the first data volume to both of the first MAC entity associated with the primary RLC entity and the second MAC entity associated with the second MAC entity.

In action 1008, when the duplication function is not activated, the PDCP entity may determine whether the data volume Nt is less than a threshold (e.g., ul-DataSplitThreshold) or not.

In action 1010, when the data volume Nt is less than the threshold, the PDCP entity may indicate the first PDCP data volume to the first MAC entity and indicate the second PDCD data volume, which is indicated as zero by the PDCP entity, to the second MAC entity. Otherwise (e.g., when the data volume Nt is greater than, or equal to, the predetermined threshold), in action 1012, the PDCP entity may indicate the first PDCP data volume to both of the first MAC entity and the second MAC entity.

According to another aspect of the present disclosure, an improved Logical Channel Prioritization (LCP) procedure is provided. The LCP procedure may involve an operation of token bucket maintenance that defines how a UE's MAC entity maintains the token bucket for an LCH. According to implementations of the present disclosure, there are two types of the token bucket maintenance operation: 1) the UE conditionally maintaining the token bucket after the LCH is established; and 2) the UE maintaining the token bucket after the LCH is established. Details of the token bucket maintenance operations are next described.

1. UE Conditionally Maintaining Token Bucket after LCH being Established

For this type of token bucket maintenance, once the UE receives an LCH configuration (e.g., the LCH-Config IE) from the base station, the MAC entity may establish an LCH in accordance with a MAC LCH configuration (e.g., mac-LogicalChannelConfig IE) contained in the LCH configuration. Then, the MAC entity may maintain a token bucket variable for the LCH. For example, the token bucket variable may be initialized to an initial value (e.g., zero) once the LCH is established by the RRC entity and may be incremented before every instance of the LCP procedure at a specific rate (e.g., the prioritized bit rate) configured by the LogicalChannelConfig IE included in the mac-LogicalChannelConfig IE.

The UE may check whether the established LCH satisfies a specific condition. If the established LCH satisfies the specific condition, only when the duplication function for the established LCH is activated and/or the MAC entity is notified by the upper layer, the token bucket variable for the established LCH may be initialized to the initial value and may be incremented before every instance of the LCP procedure at a specific rate (e.g., the prioritized bit rate) configured by the LogicalChannelConfig IE in some implementations. If the established LCH satisfies the specific condition but the duplication function for the established LCH is deactivated and/or the MAC entity is notified by the upper layer, the token bucket variable for the established LCH may be reset in some implementations.

On the other hand, if the established LCH does not satisfy the specific condition, the UE may perform an existing token bucket algorithm as defined in LTE or NR for the LCH.

In one implementation, the specific condition may be that the established LCH is not configured as the primary path (e.g., not indicated by the primaryPath IE) and is associated with a PDCP entity that is configured with the duplication function (e.g., configured with the ul-Duplication or pdcp-Duplication IE) and associated with other LCH(s). In another implementation, the specific condition may be that the established LCH is not configured as the primary path and is associated with a PDCP entity that is configured with the duplication function but not configured with the ul-DataSplitThreshold IE, and the PDCP entity is associated with other LCH(s). In yet another implementation, the specific condition may be that the established LCH is not configured as the primary path and is associated with a PDCP entity that is operated in the duplication mode and associated with other LCH(s). In still another implementation, the specific condition may be that the LCH is indicated by the upper layer(s) or indicated by an RRC message containing a specific indication while the LCH is configured. For example, the specific indication may be a specific IE (e.g., deferLCP) contained in the LCH-Config or LogicalChannelConfig IE. When the base station configures the UE, the base station may include the deferLCP IE in the LCH-Config or LogicalChannelConfig IE. In such a case, except that an LCH is configured with the deferLCP IE and is associated with a DRB configured with the duplication function and the duplication function is not activated, the MAC entity may maintain a token bucket variable Bj for each LCHj. The token bucket variable Bj may be initialized to zero (or an initial value) when the related LCHj is established, and may be incremented before every instance of the LCP procedure by the product PBR×T, where PBR is the Prioritized Bit Rate of the LCHj and T is the time elapsed since Bj was last updated.

2. UE Maintaining Token Bucket after LCH being Established

For this type of token bucket maintenance, once the UE receives the LCH configuration (e.g., the LCH-Config IE) from the base station, the MAC entity may establish an LCH in accordance with a MAC LCH configuration (e.g., mac-LogicalChannelConfig IE) contained in the LCH configuration. Then, the MAC entity may maintain a token bucket variable for the LCH. For example, the token bucket variable may be initialized to an initial value (e.g., zero) once the LCH is established by the RRC entity, and may be incremented before every instance of the LCP procedure at a specific rate (e.g., the prioritized bit rate) configured by the LogicalChannelConfig IE included in the mac-LogicalChannelConfig IE.

If the LCH to be established (e.g., indicated in the LCH-Config IE) satisfies a specific condition, the MAC entity may defer the LCH establishment until the duplication function is activated and/or the MAC entity is notified by the upper layer. On the other hand, if the duplication function is deactivated or the MAC entity is notified by the upper layer, the MAC entity may clear the LCH (e.g., de-establish the LCH).

As mentioned above, the specific condition may be that the established LCH is not configured as the primary path (e.g., not indicated by the primaryPath IE) and is associated with a PDCP entity that is configured with the duplication function (e.g., configured with the ul-Duplication or pdcp-Duplication IE) and associated with other LCH(s). In another implementation, the specific condition may be that the established LCH is not configured as the primary path and is associated with a PDCP entity that is configured with the duplication function but not configured with the ul-DataSplitThreshold IE, and the PDCP entity is associated with other LCH(s). In yet another implementation, the specific condition may be that the established LCH is not configured as the primary path and is associated with a PDCP entity that is operated in the duplication mode and associated with other LCH(s). In still another implementation, the specific condition may be that the LCH is indicated by the upper layer(s) or indicated by an RRC message containing a specific indication while the LCH is configured. For example, the specific indication may be a specific IE (e.g., deferLCP) contained in the LCH-Config or LogicalChannelConfig IE. When the base station configures the UE, the base station may include the deferLCP IE in the LCH-Config or LogicalChannelConfig IE.

According to implementations of the present disclosure, once the MAC entity receives an uplink grant from the base station, the MAC entity may avoid selecting an LCH that satisfies an LCH selection condition for the uplink grant. In one implementation, the LCH selection condition may be that the LCH is not configured as a primary path and is associated with a PDCP entity that is configured with a duplication function and associated with other LCH(s), wherein the duplication function is not activated and/or not notified to be activated by the upper layer. In yet another implementation, the LCH selection condition may be that the LCH is not configured as a primary path and is associated with a PDCP entity that is configured with the duplication function, associated with other LCH(s), and not configured with the ul-DataSplitThreshold IE, wherein the duplication function is not activated and/or not notified to be activated by the upper layer. In still another implementation, the LCH selection condition may be that the LCH is not configured as a primary path and is associated with a PDCP entity that is configured with the duplication function, operated in the duplication mode and associated with other LCH(s), wherein the duplication function is not activated and/or not notified to be activated by the upper layer. Thus, the LCH that satisfies the LCH selection condition may be skipped by the MAC entity once the duplication function is not activated.

The RRC layer may control the scheduling of uplink data by transmitting LCP related parameters for each LCH. The LCP related parameters may include, for example, a prioritisedBitRate for setting the Prioritized Bit Rate (PBR), a bucketSizeDuration for setting the Bucket Size Duration (BSD) and a priority for setting the LCH priority. According to the mechanism of LCP procedure, the data PDU may be duplicated and delivered to two LCHs with the same QoS requirement, wherein one of the two LCHs is associated with the primary RLC entity (hereafter referred to as the primary LCH), and the other LCH is associated with the secondary RLC entity (hereafter referred to as the secondary LCH). Hence, the LCP related parameters for the primary LCH and the secondary LCH may not be very different.

However, for a PDCP entity operated in the split bearer mode, the LCHs may not be configured with similar LCP configurations. In the following, improved operations on how the base station configures the LCP related parameters for the primary LCH and the secondary LCH when the PDCP entity is operated in the duplication mode or the split bearer mode are provided.

Delta Configuration

In the present implementation, for a PDCP entity operated in the duplication mode CA case or DC case, the primary LCH and the secondary LCH may apply a delta configuration. For example, the base station may configure the primary LCH with a LogicalChannelConfig IE which contains a plurality of parameters, such as: priority, priorityBitRate, BucketSizeDuration and optionally contains a plurality of restrictions, such as: allowedSubcarrierSpacing, allowedTiming, logicalChannelGroup, logicalChannelSR-Mask and logicalChannelSR-DelayTimerApplied. On the other hand, the base station may configure the secondary LCH with a simplified LogicalChannelConfig IE, which may only include a delta configuration. The delta configuration may be a subset of the parameters and restrictions included in the LogicalChannelConfig IE. For those parameters and restrictions not contained in the simplified LogicalChannelConfig IE, the secondary LCH may apply the configuration of the LogicalChannelConfig IE for the primary LCH. For those parameters and restrictions both contained in the simplified LogicalChannelConfig IE and the LogicalChannelConfig IE for the primary LCH, the secondary LCH may apply the configuration of the simplified LogicalChannelConfig IE. In this manner, the base station can use less downlink resources to configure the UE.

Individual Configuration

When the DC architecture is applied to the UE, the UE's PDCP entity may either be operated in the duplication mode DC case or the split bearer mode. In the present implementation, the secondary LCH may be configured with two sets of LCH configurations by the base station.

For example, the base station may configure the primary LCH with a LogicalChannelConfig IE (hereafter referred to as the first LogicalChannelConfig IE). The first LogicalChannelConfig IE may include parameters, such as priority, priorityBitRate and BucketSizeDuration, and optionally include restrictions, such as allowedSubcarrierSpacing, allowed Timing, logicalChannelGroup, logicalChannelSR-Mask, and logicalChannelSR-DelayTimerApplied. On the other hand, the base station may configure the secondary LCH with another LogicalChannelConfig IE (hereafter referred to as the second LogicalChannelConfig IE) and a simplified LogicalChannelConfig IE. Similar to the first LogicalChannelConfig IE, the second LogicalChannelConfig IE may include parameters, such as priority, priorityBitRate and BucketSizeDuration, and optionally include restrictions, such as allowedSubcarrierSpacing, allowed Timing, logicalChannelGroup, logicalChannelSR-Mask, and logicalChannelSR-DelayTimerApplied.

The simplified LogicalChannelConfig IE may only contain a delta configuration of the first LogicalChannelConfig IE. Once the PDCP entity is operated in the duplication mode DC case, for those parameters and restrictions not contained in the simplified LogicalChannelConfig IE, the secondary LCH may apply the configuration of the first LogicalChannelConfig IE; for those parameters and restrictions both contained in the simplified LogicalChannelConfig IE and the first LogicalChannelConfig IE, the secondary LCH may apply the configuration of the simplified LogicalChannelConfig IE. Once the PDCP entity is operated in the split bearer mode, the secondary LCH may apply the configuration second LogicalChannelConfig IE.

In one implementation, the base station may configure two LogicalChannelConFIG. IEs to the primary LCH: one of these two LogicalChannelConfig IEs may be used to configure the primary LCH when the PDCP entity is operated in the duplication mode DC case, and the other LogicalChannelConfig IE is used to configure the primary LCH when the PDCP entity may be operated in the split bearer mode.

Figure 11:
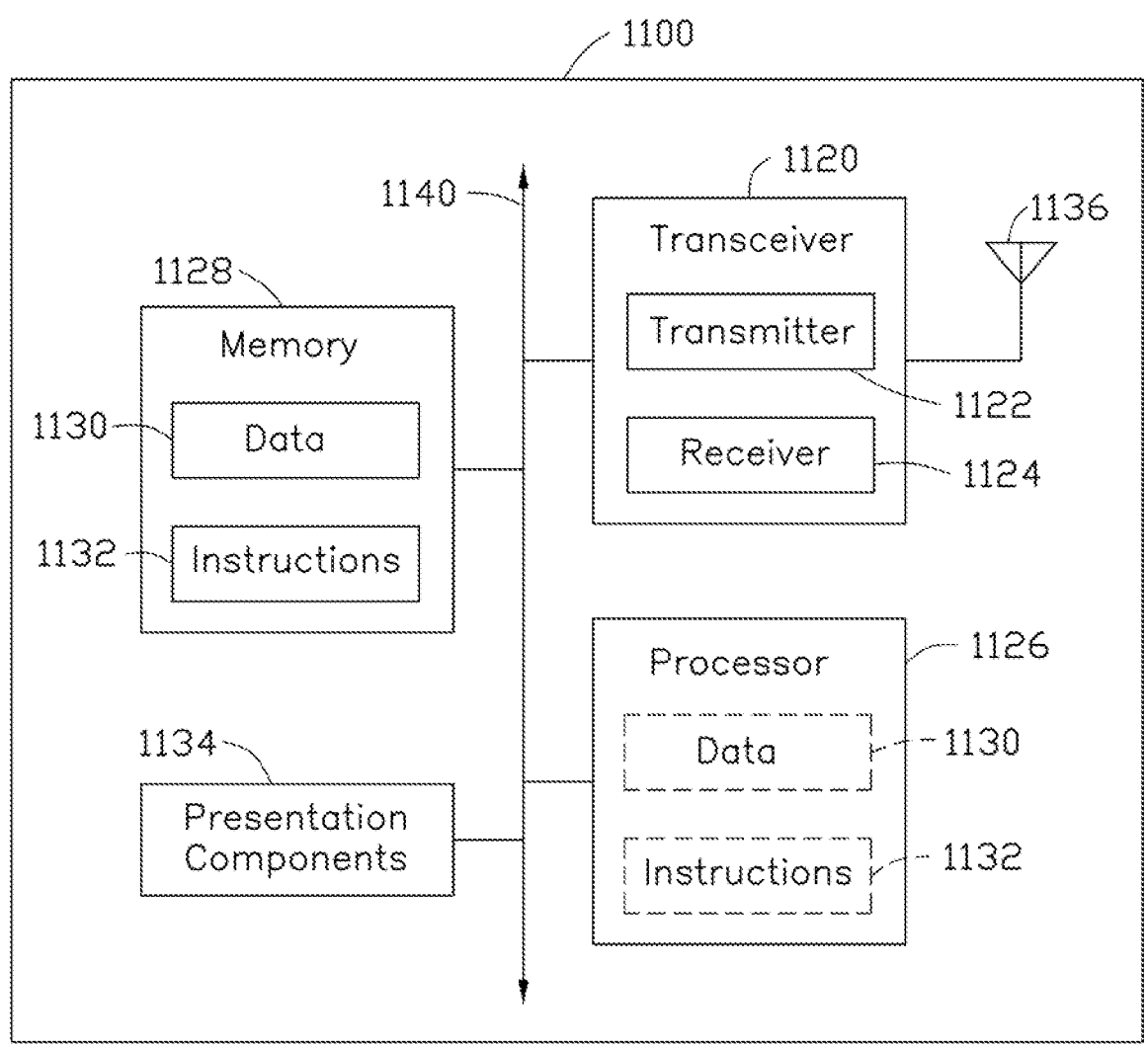
FIG. 11 illustrates a block diagram of a node for wireless communication, in accordance with various aspects of the present application.

FIG. 11 illustrates a block diagram of a node for wireless communication, in accordance with various aspects of the present application. As shown in FIG. 11, a node 1100 may include a transceiver 1120, a processor 1126, a memory 1128, one or more presentation components 1134, and at least one antenna 1136. The node 1100 may also include an RF spectrum band module, a base station communications module, a network communications module, and a system communications management module, input/output (I/O) ports, I/O components, and power supply (not explicitly shown in FIG. 11). Each of these components may be in communication with each other, directly or indirectly, over one or more buses 1140. In one implementation, the node 1100 may be a UE or a base station that performs various functions described herein, for example, with reference to FIGS. 1 through 10.

The transceiver 1120 having a transmitter 1122 (e.g., transmitting/transmission circuitry) and a receiver 1124 (e.g., receiving/reception circuitry) may be configured to transmit and/or receive time and/or frequency resource partitioning information. In some implementations, the transceiver 1120 may be configured to transmit in different types of subframes and slots including, but not limited to, usable, non-usable and flexibly usable subframes and slot formats. The transceiver 1120 may be configured to receive data and control channels.

The node 1100 may include a variety of computer-readable media. Computer-readable media can be any available media that can be accessed by the node 1100 and include both volatile and non-volatile media, removable and non-removable media. By way of example, and not limitation, computer-readable media may comprise computer storage media and communication media. Computer storage media includes both volatile and non-volatile, removable and non-removable media implemented in any method or technology for storage of information such as computer-readable.

Computer storage media includes RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media does not comprise a propagated data signal. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

The memory 1128 may include computer-storage media in the form of volatile and/or non-volatile memory. The memory 1128 may be removable, non-removable, or a combination thereof. Exemplary memory includes solid-state memory, hard drives, optical-disc drives, and etc. As illustrated in FIG. 11, The memory 1128 may store computer-readable, computer-executable instructions 1132 (e.g., software codes) that are configured to, when executed, cause the processor 1126 to perform various functions described herein, for example, with reference to FIGS. 1 through 10. Alternatively, the instructions 1132 may not be directly executable by the processor 1126 but be configured to cause the node 1100 (e.g., when compiled and executed) to perform various functions described herein.

The processor 1126 (e.g., having processing circuitry) may include an intelligent hardware device, e.g., a central processing unit (CPU), a microcontroller, an ASIC, and etc. The processor 1126 may include memory. The processor 1126 may process the data 1130 and the instructions 1132 received from the memory 1128, and information through the transceiver 1120, the base band communications module, and/or the network communications module. The processor 1126 may also process information to be sent to the transceiver 1120 for transmission through the antenna 1136, to the network communications module for transmission to a core network.

One or more presentation components 1134 presents data indications to a person or other device. Exemplary presentation components 1134 include a display device, speaker, printing component, vibrating component, and etc.

From the above description, it is manifested that various techniques may be used for implementing the concepts described in the present application without departing from the scope of those concepts. Moreover, while the concepts have been described with specific reference to certain implementations, a person of ordinary skill in the art would recognize that changes may be made in form and detail without departing from the scope of those concepts. As such, the described implementations are to be considered in all respects as illustrative and not restrictive. It should also be understood that the present application is not limited to the particular implementations described above, but many rearrangements, modifications, and substitutions are possible without departing from the scope of the present disclosure.

What is claimed is:

1. A method performed by a User Equipment (UE), the UE having a Packet Data Convergence Protocol (PDCP) entity associated with two Radio Link Control (RLC) entities, the PDCP entity being configured with a duplication function, and the duplication function being not activated, and the method comprising:
   determining, by the PDCP entity, whether the two RLC entities belong to a same cell group;
   submitting, by the PDCP entity, a PDCP Data Protocol Data Unit (PDU) to a primary RLC entity of the two RLC entities, when the two RLC entities belong to a same cell group; and
   submitting, by the PDCP entity, the PDCP Data PDU to one of the two RLC entities in response to a comparison result, when the two RLC entities belong to different cell groups,
   wherein the PDCP entity compares a total amount of PDCP data available in the PDCP entity and RLC data available in the two RLC entities for initial transmission with an uplink data split threshold to obtain the comparison result.

2. The method according to claim 1, further comprising:
   submitting, by the PDCP entity, the PDCP Data PDU to the primary RLC entity when the total amount of PDCP data available in the PDCP entity and RLC data available in the two RLC entities for initial transmission is less than the uplink data split threshold; and
   submitting, by the PDCP entity, the PDCP Data PDU to the primary RLC entity or a secondary RLC entity of the two RLC entities when the total amount of PDCP data available in the PDCP entity and RLC data available in the two RLC entities for initial transmission is equal to or larger than the uplink data split threshold.

3. The method according to claim 1, wherein the uplink data split threshold is indicated by a base station.

4. The method according to claim 1, wherein the primary RLC entity is associated with a first Medium Access Control (MAC) entity and a secondary RLC entity of the two RLC entities is associated with a second MAC entity, and the method further comprises:
   indicating, by the PDCP entity, a first PDCP data volume and a second PDCP data volume to the first MAC entity and the second MAC entity, respectively, when the two RLC entities belong to the same cell group, wherein the second PDCP data volume is indicated as zero by the PDCP entity.

5. The method according to claim 1, further comprising:
   indicating, by the PDCP entity, a first PDCP data volume to at least one MAC entity associated with at least one of the two RLC entities in response to the comparison result, when the two RLC entities belong to different cell groups.

6. The method according to claim 5, further comprising:
   indicating, by the PDCP entity, the first PDCP data volume to a first MAC entity associated with the primary RLC entity and a second MAC entity associated with a secondary RLC entity of the two RLC entities, when the total amount of PDCP data available in the PDCP entity and RLC data available in the two RLC entities for initial transmission is equal to or larger than the uplink data split threshold; and
   indicating, by the PDCP entity, the first PDCP data volume and a second PDCP data volume to the first MAC entity and the second MAC entity, respectively, when the total amount of PDCP data available in the PDCP entity and RLC data available in the two RLC entities for initial transmission is less than the uplink data split threshold, wherein the second PDCP data volume is indicated as zero by the PDCP entity.

7. The method according to claim 5, wherein the uplink data split threshold is indicated by a base station.

8. The method according to claim 1, wherein the primary RLC entity is indicated by a base station.

9. A User Equipment (UE) comprising:
   one or more non-transitory computer-readable media having computer-executable instructions embodied thereon; and at least one processor coupled to the one or more non-transitory computer-readable media, and configured to execute the computer-executable instructions to:
configure a Packet Data Convergence Protocol (PDCP) entity associated with two Radio Link Control (RLC) entities, wherein the PDCP entity is configured with a duplication function and the duplication function is not activated;
determine whether the two RLC entities belong to a same cell group;
submit a PDCP Protocol Data Unit (PDU) to a primary RLC entity of the two RLC entities, when the two RLC entities belong to a same cell group; and
submit the PDCP Data PDU to one of the two RLC entities in response to a comparison result, when the two RLC entities belong to different cell groups,
wherein the PDCP entity compares a total amount of PDCP data available in the PDCP entity and RLC data available in the two RLC entities for initial transmission with an uplink data split threshold to obtain the comparison result.

10. The UE according to claim 9, wherein the at least one processor is further configured to execute the computer-executable instructions to:
submit the PDCP Data PDU to the primary RLC entity when the total amount of PDCP data available in the PDCP entity and RLC data available in the two RLC entities for initial transmission is less than the uplink data split threshold; and
submit the PDCP Data PDU to the primary RLC entity or a secondary RLC entity of the two RLC entities when the total amount of PDCP data available in the PDCP entity and RLC data available in the two RLC entities for initial transmission is equal to or larger than the uplink data split threshold.

11. The UE according to claim 9, wherein the uplink data split threshold is indicated by a base station.

12. The UE according to claim 9, wherein the primary RLC entity is associated with a first Medium Access Control (MAC) entity and a secondary RLC entity of the two RLC entities is associated with a second MAC entity;
the at least one processor is further configured to execute the computer-executable instructions to:
indicate a first PDCP data volume and a second PDCP data volume to the first MAC entity and the second MAC entity, respectively, when the two RLC entities belong to the same cell group;
wherein the second PDCP data volume is indicated as zero by the PDCP entity.

13. The UE according to claim 9, wherein the at least one processor is further configured to execute the computer-executable instructions to:
indicate a first PDCP data volume to at least one MAC entity associated with at least one of the two RLC entities in response to the comparison result, when the two RLC entities belong to different cell groups.

14. The UE according to claim 13, wherein the at least one processor is further configured to execute the computer-executable instructions to:
indicate the first PDCP data volume to a first MAC entity associated with the primary RLC entity and a second MAC entity associated with a secondary RLC entity of the two RLC entities, when the total amount of PDCP data available in the PDCP entity and RLC data available in the two RLC entities for initial transmission is equal to or larger than the uplink data split threshold; and
indicate the first PDCP data volume and a second PDCP data volume to the first MAC entity and the second MAC entity, respectively, when the total amount of PDCP data available in the PDCP entity and RLC data available in the two RLC entities for initial transmission is less than the uplink data split threshold, wherein the second PDCP data volume is indicated as zero by the PDCP entity.

15. The UE according to claim 13, wherein the uplink data split threshold is indicated by a base station.

16. The UE according to claim 9, wherein the primary RLC entity is indicated by a base station.

* * * * *